United States Patent [19]
Takeo

[11] Patent Number: 5,055,682
[45] Date of Patent: Oct. 8, 1991

[54] METHOD FOR JUDGING AN IRRADIATION FIELD

[75] Inventor: Hideya Takeo, Kanagawa, Japan

[73] Assignee: Fuji Photo Film Co., Ltd., Kanagawa, Japan

[21] Appl. No.: 397,818

[22] Filed: Aug. 24, 1989

[30] Foreign Application Priority Data

Sep. 1, 1988 [JP] Japan ............................. 63-218851
Sep. 6, 1988 [JP] Japan ............................. 63-223318

[51] Int. Cl.$^5$ .............................................. G01N 23/04
[52] U.S. Cl. ............................... 250/327.2; 250/484.1
[58] Field of Search ................ 250/327.2 A, 327.2 D, 250/327.2 G, 484.1 B; 382/19

[56] References Cited

U.S. PATENT DOCUMENTS

| | | | |
|---|---|---|---|
| 4,851,678 | 7/1989 | Adachi et al. | 250/327.2 G |
| 4,851,984 | 7/1989 | Doi et al. | 364/413.23 |
| 4,896,038 | 1/1990 | Nakajima | 250/327.2 G |

OTHER PUBLICATIONS

Young et al., "Handbook of Pattern Recogn. and Image Process.", Academic Press, pp. 224, 226 (1986).

Primary Examiner—Jack I. Berman
Assistant Examiner—Richard Hanig
Attorney, Agent, or Firm—Sughrue, Mion, Zinn Macpeak & Seas

[57] ABSTRACT

A method for judging an irradiation field comprising steps to obtain an image signal including a plurality of image signal components corresponding to picture elements located on a recording medium from an image readout from the recording medium on which a radiation image of an object has been recorded. The shape and location of a region, which is considered to be an irradiation field formed on the recording medium, are determined on the basis of the image signal components. The ratio of the number of picture elements located in the region to the total number of the picture elements located on the recording medium is calculated and compared with a predetermined value. In cases where the ratio is not larger than the predetermined value, it is judged that the region is not the whole are of the irradiation field.

13 Claims, 6 Drawing Sheets

F I G. 8
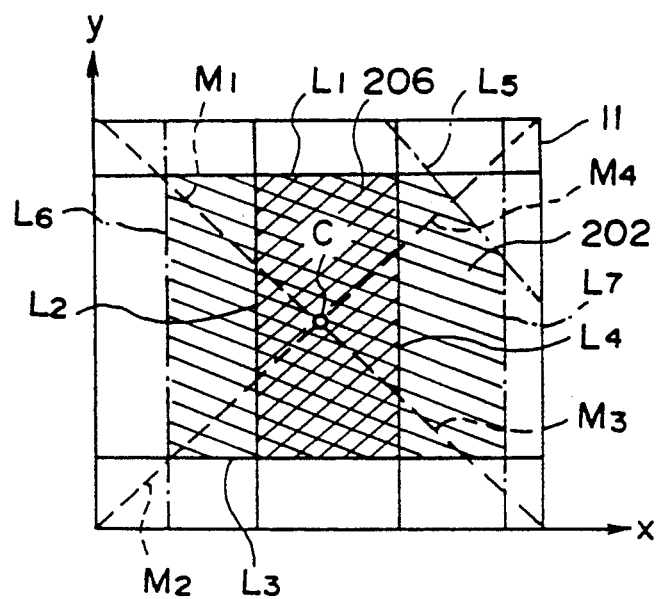

METHOD FOR JUDGING AN IRRADIATION FIELD

BACKGROUND OF THE INVENTION

1. Field of the Invention

This invention relates to a method for judging an irradiation field wherein an image signal, comprising a plurality of image signal components which correspond to picture elements located on a recording medium, is obtained from an image readout from the recording medium on which a radiation image of an object has been recorded; the shape and location of a region which is considered to be an irradiation field on the recording medium are determined on the basis of the image signal components; and then judgment is made as to whether the region is or is not the whole area of the irradiation field.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193: an X-ray image is recorded on an X-ray film having a small gamma value designed for the type of image processing to be carried out; the X-ray image is read out from the X-ray film and converted into an electric signal; and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy which was stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, use of stimulable phosphors in radiation image recording and reproducing systems was proposed. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with a stimulating ray, such as a laser beam, which cause it to emit light in proportion to the amount of energy stored during exposure to the radiation. The light emitted by the stimulable phosphor sheet upon stimulation thereof is photoelectrically detected and converted into an electric image signal, and the image signal is used to reproduce the radiation image of the object as a visible image on a recording material such as photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed. In order to obtain a desirable image density, an appropriate read-out gain is set when the emitted light is being detected and converted into an electric signal to be used in the reproduction of a visible image on a recording material or a display device.

In order to detect an image signal accurately, certain factors which affect the image signal must be set in accordance with the dose of radiation delivered to the stimulable phosphor sheet or the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as "preliminary read-out") is carried out in order to approximately ascertain the radiation image stored on the stimulable phosphor sheet. In the preliminary readout, the stimulable phosphor sheet is scanned with a light beam having a comparatively low energy level, and a preliminary read-out image signal obtained during the preliminary readout is analyzed. Thereafter, a final read-out operation (hereinafter simply referred to as "final read-out") is carried out to obtain the image signal, which is used during the reproduction of a visible image. In the final readout, the stimulable phosphor sheet is scanned with a light beam having an energy level higher than the energy level of the light beam used in the preliminary readout, and the radiation image is read out with the factors affecting the image signal adjusted to appropriate values on the basis of the results of an analysis of the preliminary read-out image signal.

The term "read-out conditions" as used hereinafter means a group of various factors, which are adjustable and which affect the relationship between the amount of light emitted by the stimulable phosphor sheet during image readout and the output of a read-out means. For example, the term "read-out conditions" may refer to a read-out gain, and a scale factor which define the relationship between the input to the read-out means and the output therefrom, or the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, in order to alter the scanning density, the diameter of the light beam may be changed, or the speed at which the stimulable phosphor sheet is scanned with the light beam may be changed.

Regardless of whether the preliminary readout is or is not carried out, it has also been proposed to analyze the image signal (including the preliminary readout image signal) obtained and to adjust image processing conditions on the basis of the results of an analysis of the image signal, which are to be used when the image signal is processed. The proposed method is applicable to cases where an image signal is obtained from a radiation image recorded on a recording medium such as conventional X-ray film, as well as to systems using stimulable phosphor sheets.

Various methods have been proposed for calculating how the read-out conditions for the final readout and/or the image processing conditions should be adjusted on the basis of an analysis of the image signal (including the preliminary read-out image signal). As one of such methods, it has been proposed in, for example, Japanese Patent Application No. 59(1984)-12658 to create a histogram of the image signal. When a histogram of an image signal is created, the characteristics of the corresponding radiation image recorded on a recording medium such as a stimulable phosphor sheet or X-ray film can be ascertained based on, for example, the maximum value of the image signal, the minimum value of the image signal, or the value of the image signal at which the histogram is maximum, i.e. the value which occurs most frequently. Therefore, if the read-out conditions for the final readout (such as the read-out gain or the scale factor) and/or the image processing conditions (such as gradation processing conditions or frequency response processing conditions) are based on an analysis of the histogram of the image signal, it becomes possible to reproduce a visible image suitable for viewing, particularly for diagnostic purposes.

On the other hand, in the course of radiation image recording, it is often desirable to keep portions of the object not related to diagnosis or the like from being exposed to radiation. One reason for this is that when the object portions not related to a diagnosis or the like are exposed to radiation, the radiation is scattered by such portions to the portion that is related to diagnosis or the like, and the image quality is adversely affected by the scattered radiation. Therefore, when a radiation image is recorded on the recording medium, an irradiation field stop is often used to limit the irradiation field to an area smaller than the overall recording region of the recording medium so that the radiation is only irradiated to that portion of the object which is to be viewed.

However, in cases where the read-out conditions for the final readout and/or the image processing conditions are calculated on the basis of the results of an analysis of the image signal in the manner described above, and the image signal is detected from a recording medium on which the irradiation field was limited during the recording of the radiation image, the radiation image cannot be ascertained accurately if the image signal is analyzed without the shape and location of the irradiation field being taken into consideration. As a result, incorrect read-out conditions and/or an incorrect image processing conditions are set, and a visible radiation image suitable for viewing, particularly for diagnostic purposes, cannot be reproduced.

In order to eliminate the aforesaid problem, it is necessary to determine the shape and location of an irradiation field, and then to calculate the read-out conditions for the final readout and/or the image processing conditions on the basis of only the image signal representing image information stored in the region inside of the irradiation field.

Accordingly, for example, the applicant has proposed in Japanese Patent Application No. 62(1987)-93633 a novel method for accurately determining the shape and location of an irradiation field even when the irradiation field has an irregular shape. The proposed method comprises the steps of detecting a prospective contour point, which is considered to be present on the contour of the irradiation field, on each of a plurality of radial lines, each of which connects a predetermined point located in the region inside of the irradiation field with an edge of a recording medium, and determining that the region surrounded by lines connecting the thus detected prospective contour points is the irradiation field.

In cases where the irradiation field is first detected and then the image signal representing the image information recorded in the region inside of the detected irradiation field is analyzed in the manner described above, appropriate read-out conditions and/or appropriate image processing conditions can be set.

However, the irradiation field includes a region at which an image of an object has been formed, a background region upon which radiation was directly irradiated without passing through the object (or without being reflected by the object), and the like. A change in the image signal level at the boundary between the background region (which was exposed to a high radiation dose) and the object image region (which was exposed to a middle level radiation dose) approximates the change in the image signal level at the contour of the irradiation field. Therefore, operations for finding the irradiation field often yield inaccurate results, and the background region in the region inside of the irradiation field is often found as the irradiation field. Also, image portions of various tissues of the object are included in the object image region, and therefore the region surrounded by part of the tissues is often found as the irradiation field.

If the shape and location of the irradiation field are determined incorrectly, the read-out conditions for the final readout and/or the image processing conditions are inaccurately set on the basis of an image signal representing image information stored in a region which has been incorrectly determined as the irradiation field. Therefore, even though operations for finding the shape and location of the irradiation field have been carried out, the radiation image produced is not suitable, especially for diagnostic purposes.

SUMMARY OF THE INVENTION

The primary object of the present invention is to provide a method for judging an irradiation field wherein the shape and location of a region which is considered to be an irradiation field are determined, and then judgment is made as to whether the region is or is not the whole area of the irradiation field.

Another object of the present invention is to provide a method for judging an irradiation field, which method enables appropriate read-out conditions for the final readout and/or appropriate image processing conditions to be determined on the basis of an image signal representing image information stored in the region inside of an irradiation field, the shape and location of which have been accurately determined.

The present invention provides a first method for judging an irradiation field, the steps comprising:

i) obtaining an image signal, comprising a plurality of image signal components corresponding to picture elements located on a recording medium (such as a stimulable phosphor sheet or a sheet of photographic film), from an image readout from the recording medium on which a radiation image of an object has been recorded, ii) determining the shape and location of a region, which is considered to be an irradiation field formed on the recording medium on the basis of said image signal components, iii) calculating the ratio of the number of picture elements located in said region to the total number of the picture elements located on said recording medium, iv) comparing said ratio with a predetermined value, and v) judging that said region is not the whole area of the irradiation field in cases where said ratio is not larger than the predetermined value.

The first method for judging an irradiation field in accordance with the present invention is based on the finding that it is very rare that an irradiation field is limited to a smaller area than the area of a recording medium during image recording. Particularly, in each radiation image recording and processing system, the area of the irradiation field is often limited to only several different sizes.

With the first method for judging an irradiation field in accordance with the present invention, after the shape and location of a region which is considered to be an irradiation field formed on the recording medium are determined, the ratio of the number of picture elements located in the region to the total number of the picture elements located on the recording medium is calculated and compared with a predetermined value. When the ratio is not larger than the predetermined value, it is judged that the region does not include the whole area of the irradiation field. In cases where it is judged that the region is not the whole area of the irradiation field, new operation processing can be employed in order accurately to determine the shape and location of the irradiation field. Therefore, read-out conditions for the final readout and/or image processing conditions can be accurately determined on the basis of an image signal representing image information stored in the region inside the irradiation field, of which the shape and location have been accurately determined.

If it is judged that the region of which the shape and location have been determined is not the whole area of the irradiation field, method (a) described below may be employed.

(a) New operation processing may be employed in order to accurately determine the shape and location of the irradiation field.

Alternatively, if the time required for operation processing, a required level of accuracy, or the like, are factors one of methods (b) through (e) described below may be employed.

(b) The whole area of the recording medium is determined as the irradiation field, and then an operation for setting the read-out conditions for the final readout and/or the image processing conditions is carried out. (With this method, the accuracy of the read-out conditions for the final readout and/or the image processing conditions is generally higher than when the read-out conditions for the final readout and/or the image processing conditions are set on the basis of image signal components corresponding to only part of the irradiation field.)

(c) Based on image signal components corresponding to the peripheral portion of the recording medium, judgment is made as to whether an irradiation field stop was or was not used during image recording (as proposed in, for example, Japanese Patent Application No. 63(1988)-80070). The whole area of the recording medium is determined as the irradiation field only if no irradiation field stop was used.

(d) A calculation is made to find the mean of differentiated values of image signal components corresponding to picture elements which are located on part of a radial line extending from the side inside the region (which has been judged to be part of the irradiation field) to the side outside the region (which part is present on the side outward from the region). In cases where the mean value is large, it is judged that an object image region is present also on the side outside the region, and the whole area of the recording medium is determined as the irradiation field.

(e) In cases where the region which has been judged to be part of the irradiation field has a polygonal shape surrounded by a plurality of lines (as described in, for example, Japanese Patent Application No. 62(1987)-79490), the mean of differentiated values of image signal components corresponding to picture elements which are located on each line is calculated. The line giving the smallest mean value is removed in order to broaden the polygonal region. The region broadened in this manner is determined to be the irradiation field.

A region which approximates the true irradiation field may be found in the manner described above. Thereafter, the read-out conditions for the final readout and/or the image processing conditions may be set on the basis of the image signal components representing image information stored in the region inside the found irradiation field.

The present invention also provides a second method for judging an irradiation field, the steps comprising:

i) obtaining an image signal, which comprises a plurality of image signal components corresponding to picture elements located on a recording medium (such as a stimulable phosphor sheet or a sheet of photographic film) from an image readout from the recording medium on which a radiation image of an object has been recorded, ii) determining the shape and location of a region, which is considered to be an irradiation field formed on the recording medium on the basis of said image signal components, iii) calculating a characteristic value of image signal components corresponding to picture elements located in said region, iv) comparing said characteristic value with a predetermined value, and v) judging whether said region is the whole area of the irradiation field or is part thereof (for example, a background region upon which radiation impinged directly without passing through an object or without being reflected therefrom) on the basis of the results of the comparison.

During the recording of the radiation image, radiation directly impinges upon the background region on the recording medium without passing through an object or without being reflected therefrom. Therefore, in cases where the values of the image signal components are proportional to the amount of radiation which has impinged upon the recording medium, the values of the image signal components corresponding to the background region are large. Also, in the background region, the values of the image signal components corresponding to adjacent picture elements do not differ very much, i.e. are approximately uniform.

On the other hand, radiation which has passed through the object (or which has been reflected from the object) impinges upon the object image region on the recording medium during the recording of the radiation image. Therefore, the mean amount of radiation which has impinged upon the object image region is smaller than the mean amount of radiation which has impinged upon the background region, and the level of the image signal (i.e. the density of the image) changes sharply at the boundary between image portions of different tissues of the object.

Also, during the recording of the radiation image, the region outside of the irradiation field on the recording medium is exposed only to scattered radiation. Therefore, the region outside of the irradiation field is similar to the background region in that the values of the image signal components corresponding to adjacent picture elements do not differ very much. However, the region outside of the irradiation field differs markedly from the background region in that the values of the image signal components are very small.

The second method for judging an irradiation field in accordance with the present invention is based on the findings described above. With this method, after the shape and location of a region which is considered to be an irradiation field formed on a recording medium are determined, a characteristic value, (for example, the mean value) of image signal components corresponding to picture elements located in said region, is calculated and compared with a predetermined value. Thereafter, based on the results of the comparison, judgment is made as to whether said region is the whole area of the irradiation field or is part thereof (for example, a background region). In oases where it is judged that said region is part of the irradiation field, new operation processing can be employed in order accurately to determine the shape and location of the irradiation field. Therefore, read-out conditions for the final readout and/or image processing conditions can be accurately determined on the basis of an image signal representing image information stored in the region inside of an irradiation field, the shape and location of which have been accurately determined.

In cases where it is judged that the region, of which the shape and location have been determined, is part of the irradiation field (for example, a background region), one of methods (a) through (e) described above may be employed in order to find a region which approximates the true irradiation field. Thereafter, the read-out conditions for the final readout and/or the image processing conditions may be set on the basis of the image signal components representing image information stored in the region inside the found irradiation field.

In preferred embodiments of the first and second methods for judging an irradiation field in accordance with the present invention, light, which is obtained from the recording medium and which represents the radiation image recorded on the recording medium, is photoelectrically detected and converted into an image signal. The term "light obtained from a recording medium and representing a radiation image" as used herein embraces light emitted by a stimulable phosphor sheet when it is exposed to stimulating rays, and light which has passed through a sheet of photographic film, or is reflected therefrom.

In the first and second methods for judging an irradiation field in accordance with the present invention, the shape and location of a region which is considered to be an irradiation field may be determined in any of known manners, as for example, disclosed in Japanese Unexamined Patent Publication Nos. 61(1986)39039, 62(1987)-93633 and 62(1987)-115969.

The image signal components may be proportional or inversely proportional to the amount of radiation to which the recording medium was exposed. Alternatively, the image signal components may be proportional or inversely proportional to the logarithmic value of the amount of radiation to which the recording medium was exposed.

Also, the term "characteristic value of the image signal components" as used herein means the value calculated from a process which discriminates whether a region is the whole area of the irradiation field, or is part thereof (for example, a background region). In cases where said part is a background region, the process utilizes the characteristic that, in the background region the amount of radiation to which said portion is exposed is larger than the amount of radiation in the other regions (for example, the object image region and the region outside of the irradiation field), and/or the image is approximately uniform and exhibits little change. For example, the characteristic value may be the mean value of the values of the image signal components representing image information stored in a region, the median value of the values of said image signal components, or the value calculated from the formula expressed as (maximum value of the values of said image signal components + minimum value of the values of said image signal components)/2. Alternatively, the characteristic value may be the value obtained from a division of the number of image signal components corresponding to the region, which have values not larger than a predetermined threshold value Th1, by the total number of the image signal components corresponding to the region. The characteristic value may also be the variance of the values of the image signal components corresponding to the region, the mean value of the differentiated values which are obtained from the differentiation of the values of the image signal components corresponding to the region, or the variance of said differentiated values. Furthermore, the characteristic value may be the value obtained from a division of the number of image signal components corresponding to the region, the differentiated values of which image signal components are not larger than a predetermined threshold value Th2, by the total number of the image signal components corresponding to the region.

BRIEF DESCRIPTION OF THE DRAWINGS

FIG. 8 is an explanatory view showing a method for extracting a region surrounded by straight lines which connect contour points of an irradiation field.

DESCRIPTION OF THE PREFERRED EMBODIMENTS

The present invention will hereinbelow be described in further detail with reference to the accompanying drawings.

Figure 4:
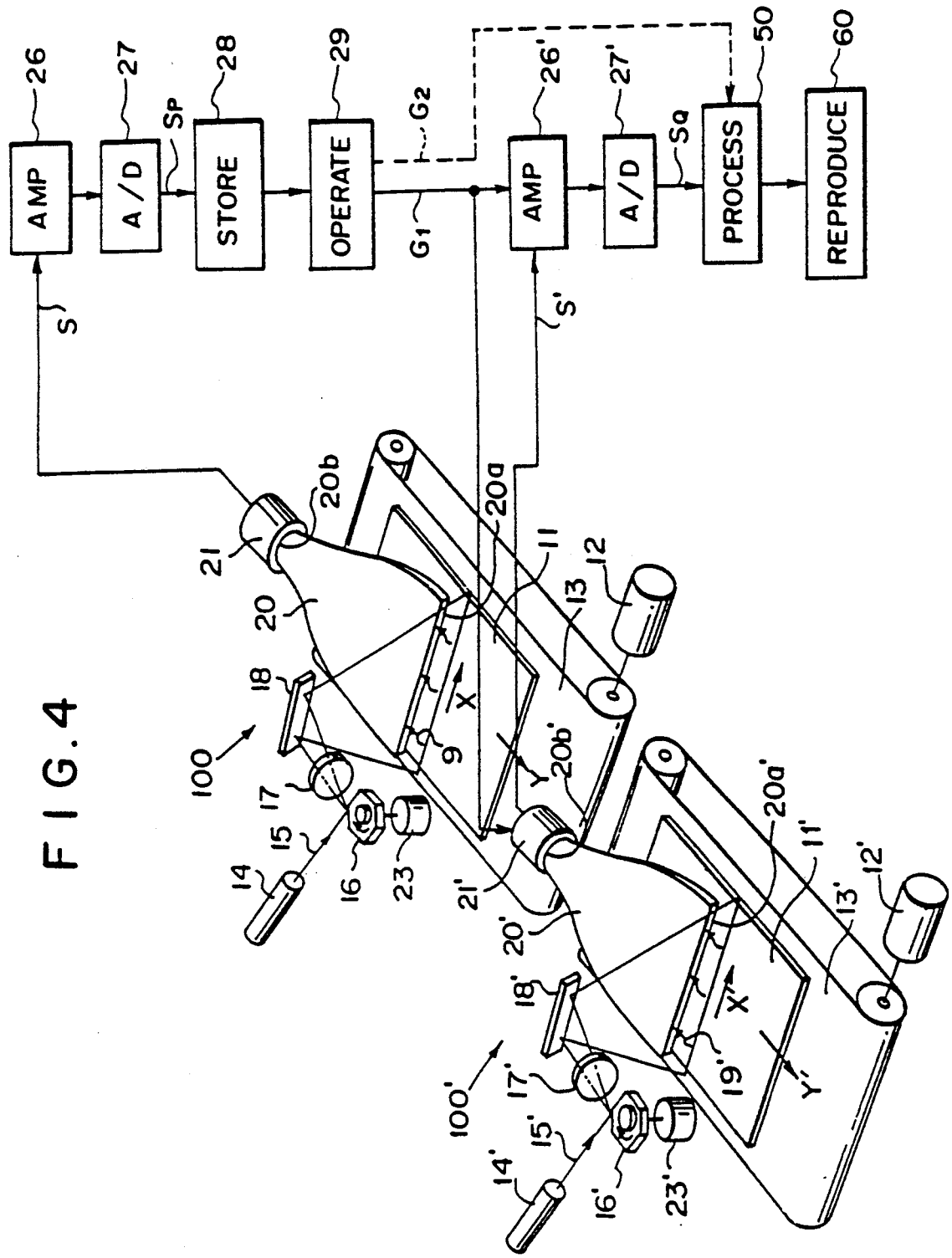
FIG. 4 is a perspective view showing an example of the radiation image read-out and reproducing apparatus wherein an embodiment of the method for judging an irradiation field in accordance with the present invention is employed.

With reference to FIG. 4, an example of a radiation image read-out and reproducing apparatus, wherein an embodiment of the first method for judging an irradiation field in accordance with the present invention is employed, utilizes a stimulable phosphor sheet and carries out a preliminary readout.

A stimulable phosphor sheet 11, on which a radiation image has been stored, is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, on which energy was stored during exposure to radiation. The stimulable phosphor sheet 11 is conveyed in a subscanning direction indicated by the arrow Y by a sheet conveyance means 13 which is constituted of an endless belt or the like and which is operated by a motor 12. A laser beam 15, having a low energy level produced by a laser beam source 14, is reflected and deflected by a rotating polygon mirror 16 which is quickly rotated by a motor 23 in the direction indicated by the arrow, and passes through a converging lens 17 which is constituted of an $f\theta$ lens or the like. The direction of the optical path of the laser beam 15 is then changed by a mirror 18, and the laser beam 15 impinges upon the stimulable phosphor sheet 11 and scans it in a main scanning direction indicated by the arrow X, whose direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during exposure to radiation. The emitted light 19 is guided by a light guide member 20, and photoelectrically detected by a photomultiplier 21 which acts as a photodetector. The light guide member 20 is made from a light guiding material such as an acrylic plate, and has a linear light input face 20a positioned so that it extends along the main scanning line on the stimulable phosphor sheet 11, and a ring-shaped light output face 20b positioned so that it is in close contact with a light receiving face of the photomultiplier 21. The emitted light 19, which has entered the light guide member 20 at its light input face 20a, is guided through by repeated total reflection inside of the light guide member 20, emanates from the light output face 20b, and is received by the photomultiplier 21. In this manner, the amount of the emitted light 19 which represents the radiation image is converted into an electric signal by the photomultiplier 21.

An analog output signal S, generated by the photomultiplier 21, is amplified by an amplifier 26, and digitized by an A/D converter 27 into a preliminary read-out image signal SP.

In the preliminary read-out, read-out conditions such as the voltage applied to the photomultiplier 21 or the amplification factor of the amplifier 26 are adjusted so that image information can be detected over a wide range in the amount of energy stored on the stimulable phosphor sheet 11 during exposure to radiation.

The preliminary read-out image signal SP obtained in the manner described above is fed into a storage means 28 and stored therein. Thereafter, the preliminary read-out image signal SP is read from the storage means 28, and fed into an operation means 29. The operation means 29 detects a region, which is considered to be the irradiation field on the stimulable phosphor sheet 11, on the basis of the preliminary read-out image signal SP. Thereafter, the operation means 29 judges whether the detected region is the whole area of the irradiation field or is part thereof (for example, a background region). In cases where it is judged that the detected region is the whole area of the irradiation field, the operation means 29 calculates the read-out conditions G1 for the final readout, such as the voltage to be applied to a photomultiplier 21' or the amplification factor to be set in an amplifier 26', on the basis of the preliminary read-out image signal SP corresponding to the detected region. In cases where it is judged that the detected region is the background region, the operation means 29 employs a new process in order to determine the shape and location of the irradiation field, and calculates the read-out conditions G1 for the final readout on the basis of the preliminary read out image signal SP corresponding to the determined irradiation field.

A stimulable phosphor sheet 11' on which the preliminary readout has been finished is placed at a predetermined position in the final read-out means 100' and scanned with a light beam 15' having an energy level higher than that of the light beam 15 used in the preliminary readout. In this manner, an image signal SQ is detected on the basis of the read-out conditions G1 adjusted as described above. The configuration of the final read-out means 100' is nearly the same as that of the preliminary read out means 100, and therefore elements corresponding to those constituting the preliminary read-out means 100 are numbered with corresponding primed reference numerals in FIG. 4.

After the image signal SQ is digitized in an A/D converter 27', the image signal SQ is fed into an image processing means 50, which carries out appropriate image processing of the image signal SQ. After being image processed, the image signal is fed into a reproducing apparatus 60, which reproduces a visible image by use of the image signal.

How the operation means 29 determines the shape and location of the irradiation field on the basis of the preliminary read-out image signal SP will be described hereinbelow.

Figure 1:
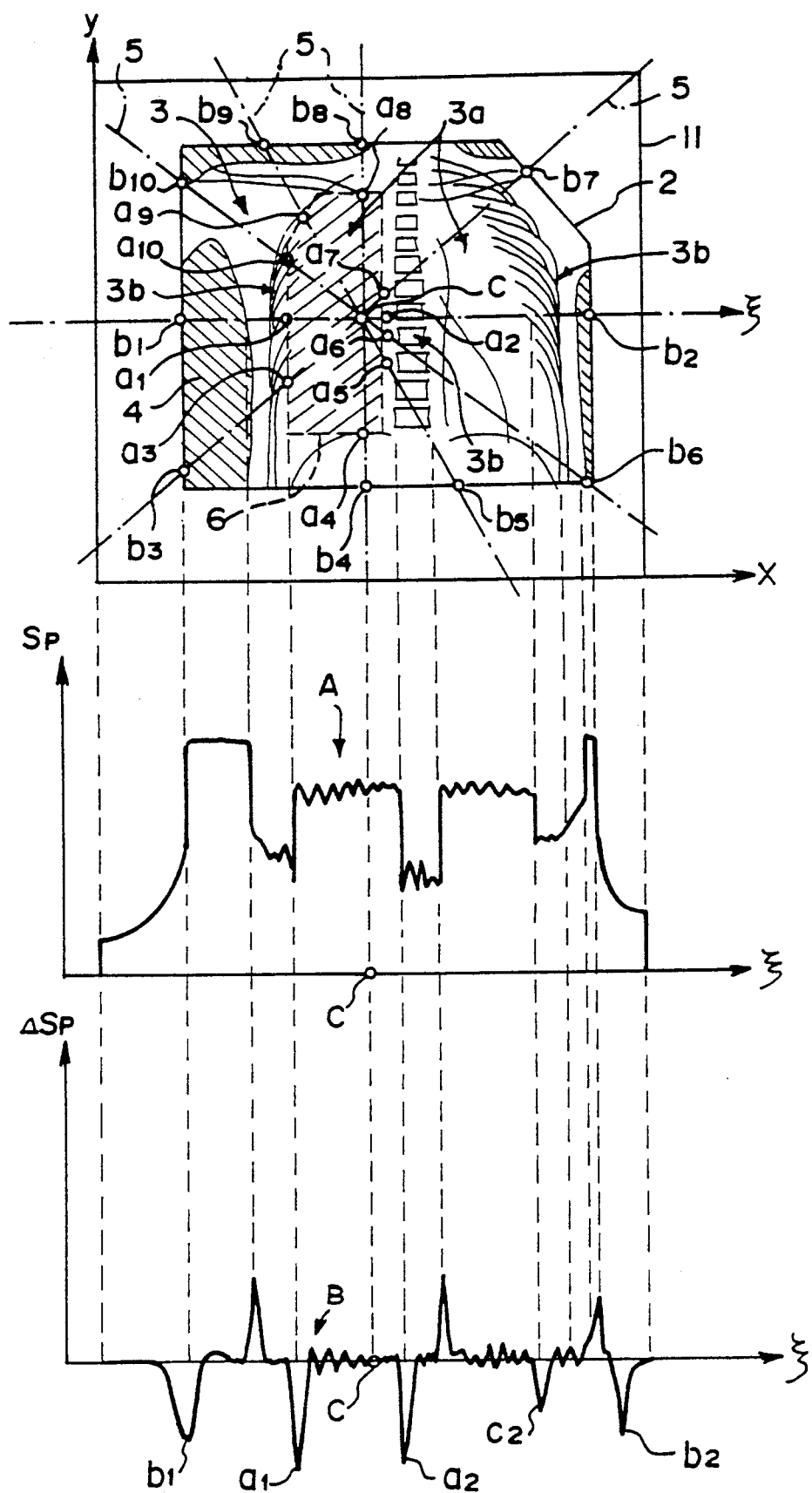
FIG. 1 is an explanatory view showing an example of a radiation image, a preliminary read-out image signal representing the radiation image, and differentiated values of the preliminary read-out image signal.

FIG. 1 shows an example of a radiation image, a preliminary read-out image signal SP representing the radiation image, and differentiated values ΔSP obtained from a differentiation processing operation performed on the preliminary read-out image signal SP.

With reference to FIG. 1, an image of an object 3 (the lungs of a human body in this case) is stored in the region inside of an irradiation field 2 on the stimulable phosphor sheet 11. Also, a background region 4, upon which radiation impinged directly, is stored in the region inside of the irradiation field 2.

In this embodiment, differentiation operations are carried out on the image signal components of the preliminary read-out image signal SP, corresponding to the picture elements arrayed along each of a plurality of lines 5, 5, . . . which extend radially from the center point C of the stimulable phosphor sheet 11. The point for which the corresponding value of the preliminary read-out image signal SP decreases sharply is detected to be a contour point of the region which is considered to be the irradiation field.

How the contour point is detected along the u axis, which is one of the lines 5, 5, . . . , will be described hereinbelow.

Curve A represents the values of the image signal components of the preliminary read-out image signal SP corresponding to the picture elements arrayed along the ξ axis.

The values of the image signal components of the preliminary read-out image signal SP are largest for a background region 4 which is located inside of the irradiation field 2 and upon which radiation has impinged directly. The values of the image signal components of the preliminary read-out image signal SP corresponding to the contour of the irradiation field 2 decrease sharply, and the values corresponding to the boundaries between the lung images 3a, 3a in the object image 3 and a bone image 3b present therebetween change sharply.

Curve B represents the results of differentiation carried out on the image signal components of the preliminary read-out image signal SP represented by curve A starting from the signal component corresponding to the center point C, and continuing with signal components corresponding to positions lying in the negative direction along the ξ axis (i.e. leftward in FIG. 1) and in the positive direction along the ξ axis (i.e. rightward in FIG. 1).

Curve B has major peaks a1 and b1 which project downward on the line extending from the center point C in the negative direction along the ξ axis. Peak a1 is higher than peak b1, and therefore the position corresponding to peak a1 is detected as a contour point.

On the line extending from the center point C in the positive direction along the ξ axis, curve B has three major peaks a2, b2 and c2 which project downward. Peak a2 is higher than peaks b2 and c2, and therefore the position corresponding to the peak a2 is detected as a contour point.

In the manner described above, contour points al (wherein l denotes positive integers-cases where l=1 to 10 are shown in FIG. 1) are detected respectively on a plurality of the lines 5, 5, . . . each of which connects the center point C with the edge of the stimulable phosphor sheet 11. After the contour points al are detected, lines connecting them may be assumed to follow the contour of the region which is considered to be the irradiation field. One of several methods is used to find the lines connecting the contour points al, for example: a method wherein contour points remaining after a smoothing process has been carried out are connected together, a method wherein the method of least squares is applied to find a plurality of straight lines and wherein the straight lines are then connected together, or a method wherein a spline curve or the like is applied. In this embodiment, the operation means 29 finds a plurality of straight lines connecting the contour points al by utilizing a Hough transformation. The processing done to find the straight lines will hereinbelow be described in detail.

Figure 2:
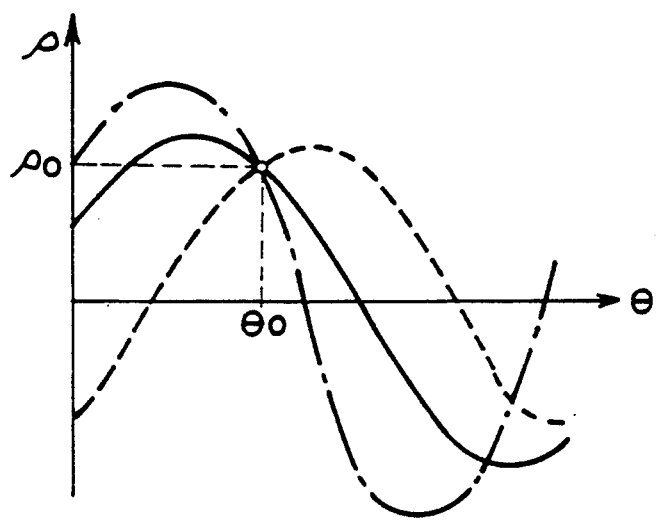
FIG. 2 is an explanatory graph showing a method for detecting straight lines which connect contour points of an irradiation field.

A corner (the lower corner of the left edge) of the stimulable phosphor sheet 11 shown in FIG. 1 is taken as the origin, and the x and y axes are set as shown in FIG. 1. The coordinates of the contour points are expressed as: $(x1,y1), (x2,y2), \ldots, (xn,yn)$. These coordinates are represented by $(xo,yo)$. The operation means 29 shown in FIG. 4 calculates the curves expressed as $$\rho = xo\cos\theta + yo\sin\theta$$

where xo and yo are constants, for every contour point coordinate $(xo,yo)$. FIG. 2 shows the curves thus obtained, and the number of curves equals the number of the contour point coordinates $(xo,yo)$.

Figure 3:
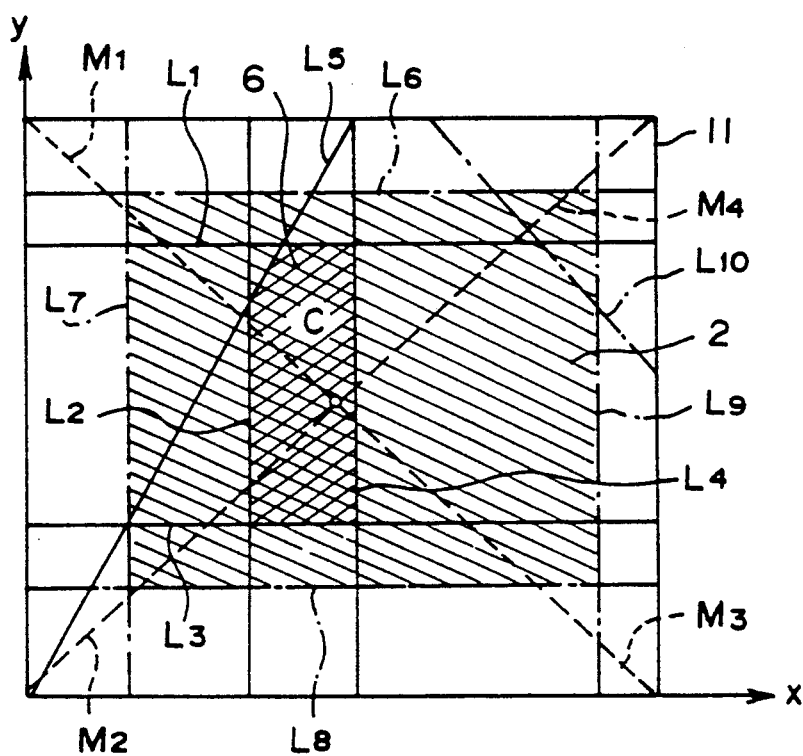
FIG. 3 is an explanatory view showing a method for extracting a region surrounded by straight lines which connect contour points of an irradiation field.

Then, the operation means 29 calculates the coordinates $(\rho o,\theta o)$ of the points where the curves intersect and where the number of curves intersecting at each point $(\rho o,\theta o)$ is not smaller than a predetermined number Q. Because of errors in finding the contour point coordinates $(xo,yo)$, many curves do not intersect exactly at a single point. Therefore, by way of example, in the case where multiple sets of two curves have intersections spaced at only small distances not longer than a predetermined distance from one another, the point of intersection at the middle of the group of the intersections is taken as the aforesaid intersection $(\rho o,\theta o)$. Then, for each point of intersection $(\rho o,\theta o)$, the operation means 29 calculates a straight line expressed as $$\rho o = x\cos\theta o + y\sin\theta o$$

in the x-y orthogonal coordinate system. A plurality of the contour point coordinates $(xo,yo)$ lie along the straight line thus calculated. In cases where the contour points al are distributed as shown in FIG. 1, the straight lines L1, L2, L3, L4 and L5 shown in FIG. 3 are obtained. They are extensions of the lines forming the contour of the region 6 which is considered to be the irradiation field and which is shown in FIG. 1. The operation means 29 then detects the region surrounded by the plurality of straight lines L1, L2, L3, . . . , Ln, obtained in this manner, and said region is found as the region which is considered to be the irradiation field. Specifically the shape of the region can be found in the manner described below. The operation means 29 stores information about line segments M1, M2, M3, . . . , Mm connecting the corners of the stimulable phosphor sheet 11 with the center point C (four line segments in cases where the stimulable phosphor sheet 11 is rectangular), and detects whether or not each of the line segments M1 to Mm intersects with each of the straight lines L1 to Ln. In cases where an intersection is present, the operation means 29 divides the stimulable phosphor sheet 11 into two regions: one including the corner of the stimulable phosphor sheet 11 to which the line segment is connected and delineated by the straight line, and the other including the remainder of the stimulable phosphor sheet 11. The operation means 29 then discards the region including the corner. This operation is carried out for all of the straight lines L1 to Ln and the line segments M1 to Mm, and the region surrounded by the straight lines L1 to Ln is not discarded. The region thus obtained is detected as the region 6 which is considered as the irradiation field and which is shown in FIG. 1.

After finding the shape and location of the region 6 which is considered to be the irradiation field, the operation means 29 judges whether the region 6 is the whole area of the irradiation field or is part thereof in the manner described below.

First, the operation means 29 calculates the area S6 of the region 6. The area S6 is proportional to the number of the picture elements located in the region 6. Then, the operation means 29 calculates the ratio α of the area S6 to the whole area S11 of the stimulable phosphor sheet 11 from the formula expressed as $$\alpha = S6/S11 \quad (1)$$

The ratio α is compared with a predetermined threshold value Th. In cases where the formula expressed as $$\alpha \leq Th \quad (2)$$

is satisfied, it is judged that the region 6 is part of the irradiation field. In cases where Formula (2) is not satisfied, it is judged with a high probability that the region 6 represents the whole area of the irradiation field.

In the embodiment described above, the ratio u is expressed as $$\alpha = S6/S11 = 0.08$$

and the predetermined value Th is set as $$Th = 0.2$$

Therefore, $$\alpha = 0.08 < Th = 0.2$$

Because Formula (2) is satisfied, it is judged that the region 6 is part of the irradiation field.

In cases where the shape and location of the region (the irradiation field 2) have been determined accurately in the manner described above, the ratio u of the area S2 of the irradiation field 2 to the whole area S11 of the stimulable phosphor sheet 11 is calculated from the formula expressed as $$\alpha = S2/S11 \approx 0.5$$

Therefore, the relationship between the ratio α and the predetermined value Th=0.2 is expressed as $$\alpha = 0.5 > Th = 0.2$$

Because Formula (2) is not satisfied, it is judged that the region is the whole area of the irradiation field.

How the shape and location of the irradiation field are determined accurately in this embodiment will be described hereinbelow.

As described above, curve B has two major peaks a1 and b1 which project downward on the line extending from the center point C in the negative direction along the ξ axis. On the line extending from the center point C in the positive direction along the ξ axis, curve B has three major peaks a2, b2 and c2 which project downward. The peak a1 is higher than the peak b1, and the peak a2 is higher than the peaks b2 and c2. Therefore, the positions corresponding to the peaks a1 and a2 were employed as the contour points. However, it was judged that the region 6, surrounded by the straight lines connecting the contour points a1 thus detected, was part of the irradiation field. Therefore, in cases where a plurality of peaks are thus present for each of the plurality of the lines 5, 5, ... each of which connects the center point C with the edge of the stimulable phosphor sheet 11, the positions corresponding to the peaks which positions are present on the contour of the region 6 are ignored, and the peaks b1 the positions of which have the second highest possibility of being the contour points are employed as the contour points. Specifically, in the embodiment of FIG. 1, in lieu of the positions a1 through a10, positions b1 through b10 are employed as the contour points. When a Hough transformation is carried out for the contour points thus detected, the irradiation field 2, surrounded by straight lines L6, L7, L8, L9 and L10 as shown in FIG. 3, is found. In cases where it is probable that the irradiation field 2 thus found is part of the true irradiation field, the operations described above may be repeated in order to judge whether the irradiation field 2 is the whole area of the true irradiation field or is part thereof.

After the shape and location of the irradiation field 2 is found, the read-out conditions G1 for the final read-out shown in FIG. 4 are adjusted, based on the preliminary read-out image signal SP corresponding to the region inside of the irradiation field 2, so that the image signal representing the image information stored in the region inside of the irradiation field 2 is detected appropriately.

In this embodiment, the center point C of the stimulable phosphor sheet 11 is employed as the point located in the region inside of the irradiation field 2, and differentiation processing is started on image signal components representing image information stored at positions neighboring the center point C of the stimulable phosphor sheet 11. However, any position inside the irradiation field 2 may be employed a said point located in the region inside of the irradiation field 2. For example, in cases where the irradiation field is limited to a very small area, the center point C of the stimulable phosphor sheet may be present in the region outside of the irradiation field. In such cases, for said point, a position should be selected which always lies in the region inside the irradiation field, for example: the position at which the value of the preliminary read-out image signal SP is the largest, the position at which the center of gravity of the picture elements is located when the picture elements are weighted with the values of the image signal components of the preliminary read-out image signal SP, or the position at which the center of gravity of the picture elements corresponding to the region on a larger value side of the preliminary read-out image signal SP is located when the preliminary read-out image signal SP is converted into the two-valued system. However, in the first method for judging an irradiation field in accordance with the present invention, the operation process for finding the irradiation field is not limited to the process wherein the region which is considered to be the irradiation field is found on the basis of the preliminary read-out image signal SP corresponding to the positions on the radial lines which extend from the point located in the region inside of the irradiation field 2.

In the aforesaid embodiment of the first method for judging an irradiation field in accordance with the present invention, the preliminary read-out means 100 and the final read-out means 100' are separate from each other. Alternatively, if the configurations of the preliminary read-out means 100 and the final read out means 100' are approximately identical to each other, a single read-out means may be utilized for performing both the preliminary readout and the final readout. In this case, after being subjected to the preliminary readout, the stimulable phosphor sheet 11 may be moved back to the position at which image readout can be started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

In the aforesaid embodiment of the first method for judging an irradiation field in accordance with the present invention, the read-out conditions for the final read-out are adjusted by the operation means 29. Alternatively, predetermined read-out conditions may be used when the final readout is carried out, regardless of the characteristics of the preliminary read-out image signal SP. On the basis of the preliminary read out image signal SP, the operation means 29 may adjust image processing conditions G2 to be used in the image processing means 50 which carries out image processing of the image signal SQ. The image processing conditions G2 calculated by the operation means 29 may then be fed into the image processing means 50 as indicated by the broken line in FIG. 4. The operation means 29 may also adjust both the read-out conditions and the image processing conditions.

The first method for judging an irradiation field in accordance with the present invention is also applicable to radiation image read-out apparatuses wherein no preliminary read-out operations are carried out, and only the aforesaid final read-out operations are carried out. In these cases, an image signal is obtained using predetermined read-out conditions. Based on the image signal, image processing conditions are calculated by an operation means. The calculated image processing conditions are taken into consideration when the image signal is processed.

The first method for judging an irradiation field in accordance with the present invention is not limited to the aforesaid embodiment wherein a stimulable phosphor sheet is used, and is also applicable to, for example, an X-ray image read-out apparatus wherein conventional X-ray film is used.

Figure 5:
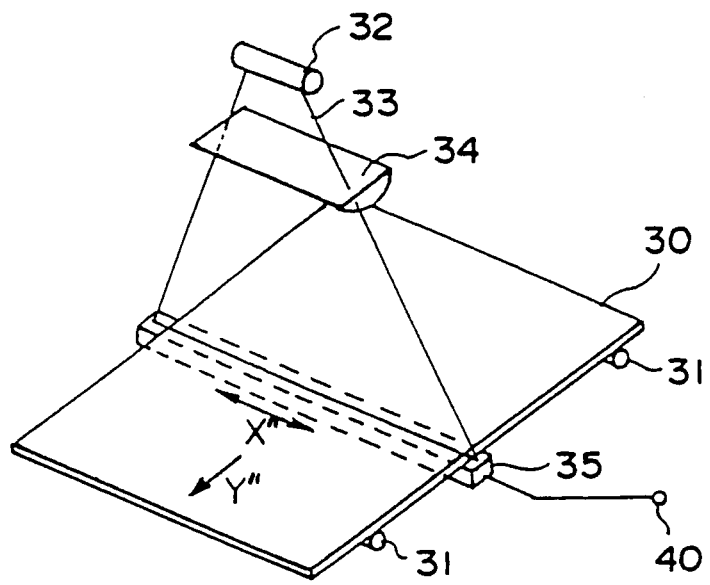
FIG. 5 is a perspective view showing an example of an X-ray image read-out apparatus wherein an X-ray image recorded on an X-ray film is read out.

With reference to FIG. 5, a sheet of X-ray film 30 on which an X-ray image has been recorded is placed at a predetermined position, and is conveyed in the direction indicated by the arrow Y" by a film conveyance means 31.

Reading light 33 produced by an elongated light source 32 extending in one direction is converged by a cylindrical lens 34, and is linearly irradiated onto the X-ray film 30 along the directions indicated by the arrow X", which are approximately normal to the direction indicated by the arrow Y". A MOS sensor 35 is positioned below the X-ray film 30 so that the MOS sensor 35 can receive the reading light 33 which has passed through the X-ray film 30, the intensity of which light has been modulated in accordance with the X-ray image recorded on the X-ray film 30. The MOS sensor 35 comprises a plurality of solid state photoelectric conversion devices which are arrayed linearly at intervals equal to the intervals between the picture elements of the X-ray image along the directions indicated by the arrow X". As long as the X-ray film 30 is conveyed in the direction indicated by the arrow Y" while being exposed to the reading light 33, the MOS sensor 35 detects the reading light, which has passed through the X-ray film 30, at predetermined intervals, corresponding to the intervals between the picture elements of the X-ray image along the direction indicated by the arrow Y".

Figure 6:
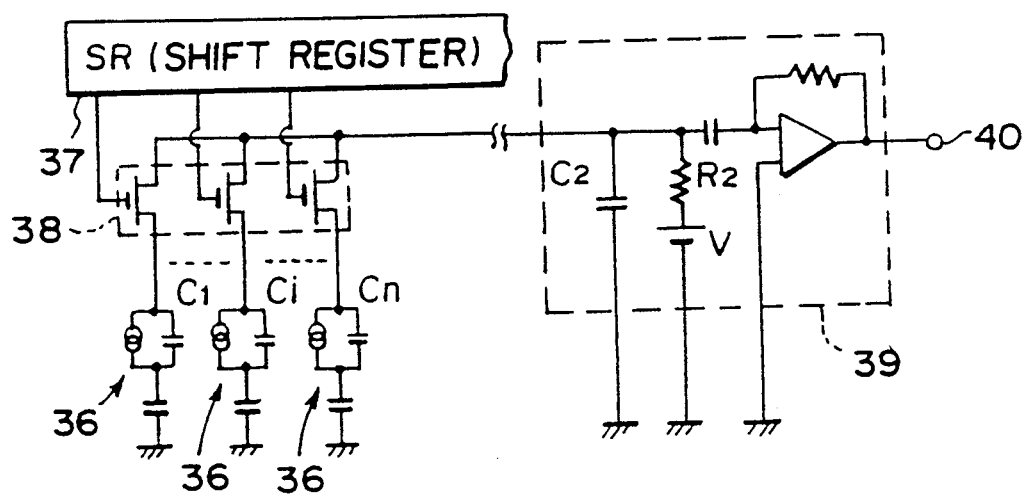
FIG. 6 is a circuit diagram showing an equivalent circuit for a MOS sensor.

FIG. 6 shows an equivalent circuit for the MOS sensor 35.

With reference to FIG. 6, photocarriers generated when the reading light 33 impinges upon the solid state photoelectric conversion devices 36, 36, ... accumulate in capacitors Ci ($i = 1, 2, \ldots, n$) of the solid state photoelectric conversion devices 36, 36, ... The switches of a switch section 38 are turned on and off sequentially in order to detect the number of photocarriers which accumulate in the capacitors Ci. A shift register 37 controls the switches of the switch section 38, and a time-serial image signal is obtained. The image signal is then amplified by a pre-amplifier 39 and is output at an output terminal 40 of the pre-amplifier 39.

The analog image signal output by the MOS sensor 35 is sampled and digitized into an image signal. Thereafter, the shape and location of the region which is considered to be the X-ray irradiation field are found from an analysis of the digital image signal, and it is judged whether the region is the whole area of the irradiation field or is part thereof in the same manner as in the aforesaid embodiment. In the embodiment shown in FIG. 5, the MOS sensor 35 may be replaced by a charge coupled device (CCD) or a charge priming device (CPD). Also, in order to read out the X-ray image from the X-ray film 30, the X-ray film 30 may be scanned two-dimensionally with a light beam in the same manner as that described above for image readout from the stimulable phosphor sheet. Furthermore, instead of light which has passed through the X-ray film 30 being detected, light reflected by the X-ray film 30 may be detected.

The first method for judging an irradiation field in accordance with the present invention is applicable to various types of radiation image read-out apparatuses wherein a radiation image of an object is read out from a recording medium in order to obtain an image signal comprising a plurality of image signal components corresponding to picture elements located on the recording medium.

An embodiment of the second method for judging an irradiation field in accordance with the present invention will be described hereinbelow.

In this embodiment, the operation means 29 in the radiation image read-out and reproducing apparatus shown in FIG. 4 detects the irradiation field on the basis of the preliminary read-out image signal SP in the manner described below.

Figure 7:
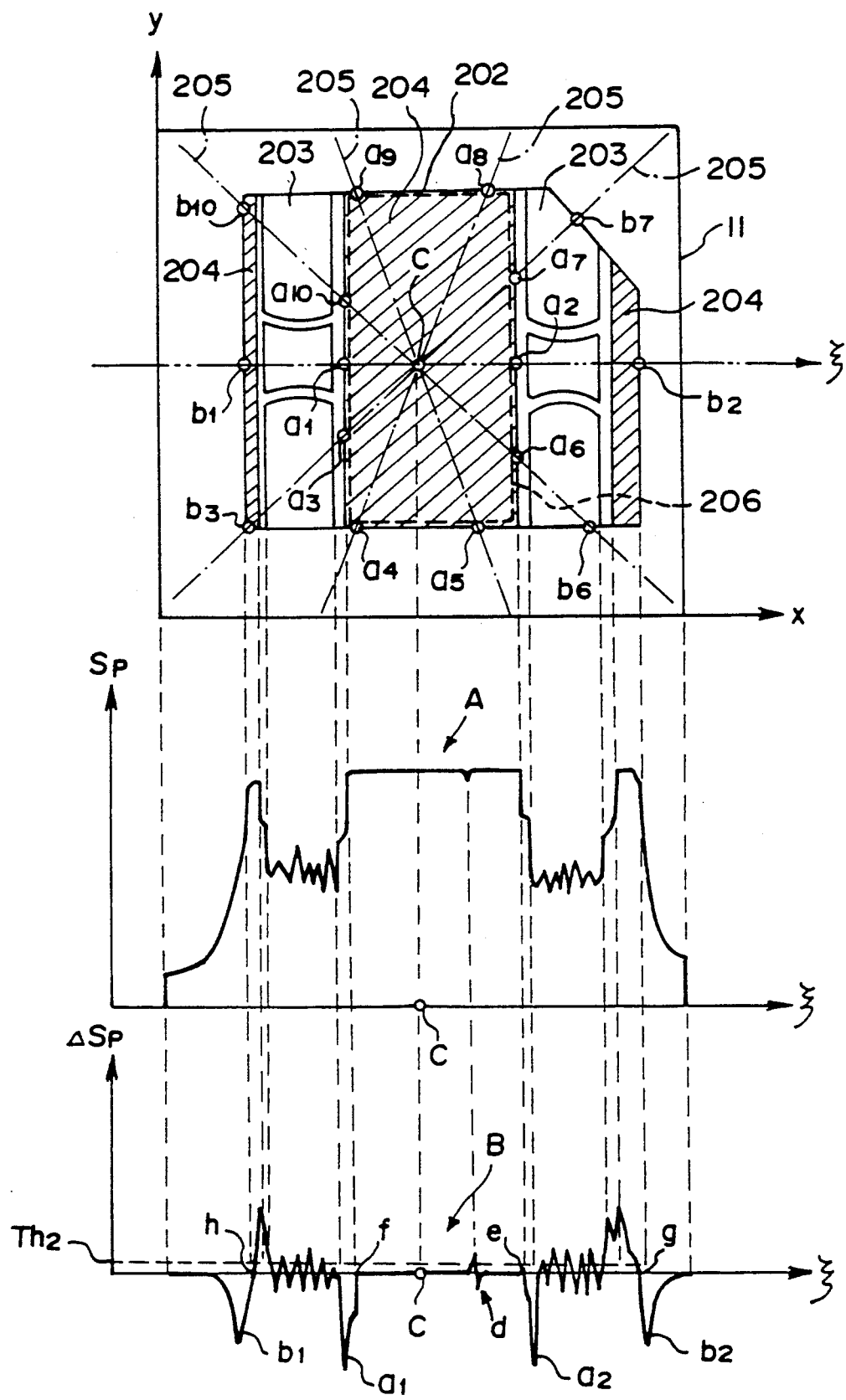
FIG. 7 is an explanatory view showing an example of a radiation image, a preliminary read-out image signal representing the radiation image, and differentiated values of the preliminary read-out image signal.

FIG. 7 shows an example of a radiation image, a preliminary read-out image signal SP representing the radiation image, and differentiated values ΔSP obtained from a differentiation processing operation performed on the preliminary read-out image signal SP.

With reference to FIG. 7, an image of an object 203 (the legs of a human body in this case) is stored in the region inside of an irradiation field 202 on a stimulable phosphor sheet 11. Also, a background region 204, upon which radiation impinged directly, is stored in the region inside of the irradiation field 202.

In this embodiment, differentiation operations are carried out on the image signal components of the preliminary read-out image signal SP corresponding to the picture elements arrayed along each of a plurality of lines 205, 205, ... which extend radially from the center point C of the stimulable phosphor sheet 11. The point at which the corresponding value of the preliminary readout image signal SP decreases sharply is detected as a contour point of the region which is considered to be the irradiation field.

How a contour point is detected along the $\xi$ axis, which is one of the lines 205, 205, ..., will be described hereinbelow.

Curve A represents the values of the image signal components of the preliminary read-out image signal SP corresponding to the picture elements arrayed along the $\xi$ axis.

The values of the image signal components of the preliminary read-out image signal SP are largest for a background region 204 which is located inside of the irradiation field 202 and upon which radiation impinged directly. The values of the image signal components of the preliminary read-out image signal SP, corresponding to the contour of the irradiation field 202, decrease sharply, and the values corresponding to the boundaries between the object image 203 and the neighboring parts of the background region 204 change sharply.

Curve B represents the results of differentiation carried out on the image signal components of the preliminary read-out image signal SP represented by curve A starting from that signal component corresponding to the center point C and continuing with signal components corresponding to positions lying in the negative direction along the $\xi$ axis (i.e. leftward in FIG. 7) and in the positive direction along the $\xi$ axis (i.e. rightward in FIG. 7).

Curve B has major peaks a1 and b1 which project downward on the line extending from the center point C in the negative direction along the $\xi$ axis. Peak a1 is higher than peak b1, and therefore the position corresponding to the peak a1 is detected as a contour point.

On the line extending from the center point C in the positive direction along the $\xi$ axis, curve B has two major peaks a2 and b2 which project downward. Peak a2 is higher than peak b2, and therefore the position corresponding to the peak a2 is detected as a contour point.

In the manner described above, contour points al (wherein l denotes positive integers, cases where l=1 to 10 are shown in FIG. 7) are detected respectively on a plurality of the lines 205, 205, ... each of which connects the center point C with the edge of the stimulable phosphor sheet 11. After the contour points al are detected, lines connecting them may be assumed to follow the contour of the region which is considered to be the irradiation field. One of the several methods mentioned above is used to find the lines connecting the contour points al. In this embodiment, the operation means 29 finds a plurality of straight lines connecting the contour points al by utilizing a Hough transformation in the same manner as that in the aforesaid embodiment of the first method for judging an irradiation field in accordance with the present invention.

In cases where the contour points al are distributed as shown in FIG. 7, the straight lines L1, L2, L3 and L4 shown in FIG. 8 are obtained. They are extensions of the lines forming the contour of the region 206 which is considered to be the irradiation field and which is shown in FIG. 7. The operation means 29 then detects the region surrounded by the plurality of straight lines L1, L2, L3, ..., Ln obtained in this manner, and said region is found as the region which is considered to be the irradiation field. Specifically, the shape of the region can be found in the manner described below. The operation means 29 stores information about line segments M1, M2, M3, ..., Mm connecting the corners of the stimulable phosphor sheet 11 with the center point C (four line segments in cases where the stimulable phosphor sheet 11 is rectangular), and detects whether or not each of the line segments M1 to Mm intersects with each of the straight lines L1 to Ln. In cases where an intersection is present, the operation means 29 divides the stimulable phosphor sheet 11 into two regions: one including the corner of the stimulable phosphor sheet 11 to which the line segment is connected and delineated by the straight line, and the other including the remainder of the stimulable phosphor sheet 11. The operation means 29 then discards the region including the corner. This operation is carried out for all of the straight lines L1 to Ln and the line segments Ml to Mm, and the region surrounded by the straight lines L1 to Ln is not discarded. The region thus obtained is detected as the region 206 which is considered to be the irradiation field and which is shown in FIG. 7.

After finding the shape and location of the region 206 which is considered to be the irradiation field, the operation means 29 judges whether the region 206 is the whole area of the irradiation field or is the background region on the basis of the preliminary read-out image signal SP corresponding to the region 206.

A characteristic value of the preliminary read-out image signal SP is used to judge whether the region 206 is the whole area of the irradiation field or is the background region. In this embodiment, a value, obtained from a division of the number of the image signal components corresponding to the region 206, the differentiated values ΔSP, of which image signal components are not larger than a predetermined threshold value Th2 by the total number (the area) of the image signal components corresponding to the region 206, is employed as the characteristic value. When the characteristic value is not smaller than a predetermined value Th3, it is judged that the region 206 is the background region. When the characteristic value is smaller than the predetermined value Th3, it is judged that the region 206 is the whole area of the irradiation field.

Operations carried out for this purpose will be described hereinbelow with reference to FIG. 7. In FIG. 7, differentiated values ΔSP of the preliminary read-out image signal SP corresponding to the region 206 are calculated, for example, along a plurality of lines parallel to the $\xi$ axis. Operations for the differentiated values ΔSP of the preliminary read-out image signal SP corresponding to picture elements arrayed along the $\xi$ axis will be described hereinbelow. The differentiated values $\Delta SP$ of the preliminary read-out image signal SP corresponding to the region 206 which is considered to be the irradiation field (the differentiated values $\Delta SP$ plotted between points e and f of curve B) have no peak, except for a noise-like peak formed at a point d. Therefore, the value F, obtained from a division of the number of the image signal components corresponding to the region 206, the differentiated values $\Delta SP$ of which image signal components are not larger than the threshold value Th2 by the total number of the image signal components corresponding to the region 206, is expressed as F=1-u wherein u is a very small value. Therefore, when the value F is compared with the predetermined value Th3 (for example, 0.85), it is found that F>Th3. Accordingly, it is judged that the region 206 is the background region.

In cases where the shape and location of the region (the irradiation field 2) have been determined accurately in the manner described above, operations are carried out in the same manner as described above for the u of curve B. Many differentiated values $\Delta SP$ of the preliminary read-out image signal SP corresponding to the object image 203 exceed the threshold value Th2. Therefore, F<Th3, and it is judged that the irradiation field 202 is the whole area of the true irradiation field.

How the shape and location of the irradiation field are determined accurately in this embodiment will be described hereinbelow.

As described above, curve B has two major peaks a1 and b1 which project downward on the line extending from the center point C in the negative direction along the $\xi$ axis. On the line extending from the center point C in the positive direction along the $\xi$ axis, curve B has two major peaks a2 and b2 which project downward. The peak a1 is higher than the peak b1, and the peak a2 is higher than the peak b2. Therefore, the positions corresponding to the peaks a1 and a2 were employed as the contour points. However, it was judged that the region 206 surrounded by the straight lines connecting the contour points a1 thus detected was the background region. Therefore, in cases where a plurality of peaks are thus present for each of the plurality of the lines 205, 205, ... each of which connects the center point C with the edge of the stimulable phosphor sheet 11, the positions corresponding to the peaks which positions are present on the contour of the region 206 are ignored, and the peaks b1 the positions of which have the second highest possibility of being the contour points are employed as the contour points. Specifically, in the embodiment of FIG. 7, in lieu of the positions a1, a2, a3, a6, a7 and a10, positions b1, b2, b3, b6, b7 and b10 are employed as the contour points. On each of the lines corresponding to the positions a4, a5, a8 and a9, only a single peak is present. Therefore, positions a4, a5, a8 and a9 are again employed as the contour points. When a Hough transformation is carried out for the contour points thus detected, the irradiation field 202, surrounded by straight lines L1, L3, L5, L6 and L7 as shown in FIG. 8, is found. In cases where it is probable that the irradiation field 202 thus found is the background region, the operations described above may be repeated in order to judge whether the irradiation field 202 is the whole area of the true irradiation field or is the background region.

After the shape and location of the irradiation field 202 is found, the read-out conditions G1 for the final readout shown in FIG. 4 are adjusted based on the preliminary read-out image signal SP corresponding to the region inside of the irradiation field 202, so that the image signal representing the image information stored in the region inside the irradiation field 202 is detected appropriately.

In the embodiment shown in FIG. 7, the center point C of the stimulable phosphor sheet 11 is employed as the point located in the region inside the irradiation field 202, and differentiation processing is started on image signal components representing image information stored at positions neighboring the center point C of the stimulable phosphor sheet 11. However, any position inside the irradiation field 202 may be employed as said point located in the region inside of the irradiation field 202. For example, in cases where the irradiation field is limited to a very small area, the center point C of the stimulable phosphor sheet may be present in the region outside the irradiation field. In such cases, for said point, a position should be selected which always lies in the region inside of the irradiation field, for example: the position at which the value of the preliminary read-out image signal SP is the largest, the position at which the center of gravity of the picture elements is located when the picture elements are weighted with the values of the image signal components of the preliminary read-out image signal SP, or the position at which the center of gravity of the picture elements corresponding to the region on a larger value side of the preliminary read-out image signal SP is located when the preliminary read-out image signal SP is converted into the two-valued system. However, in the second method for judging an irradiation field in accordance with the present invention, the operation processing for finding the irradiation field is not limited to the processing wherein the region which is considered to be the irradiation field is found on the basis of the preliminary read-out image signal SP corresponding to the positions on the radial lines extending from the point located in the region inside of the irradiation field 202.

In the aforesaid embodiment of the second method for judging an irradiation field in accordance with the present invention, a single read-out means may be utilized for performing both the preliminary readout and the final readout as described above for the embodiment of the first method for judging an irradiation field in accordance with the present invention. Also, as described above, the operation means 29 may adjust the image processing conditions G2 or both the read-out conditions G1 and the image processing conditions G2 on the basis of the preliminary read-out image signal SP.

As the first method for judging an irradiation field in accordance with the present invention, the second method for judging an irradiation field in accordance with the present invention is also applicable to radiation image read-out apparatuses, wherein no preliminary read-out operations are carried out and only the aforesaid final read-out operations are carried out.

Furthermore, the second method for judging an irradiation field in accordance with the present invention is not limited to the aforesaid embodiment wherein a stimulable phosphor sheet is used, and is also applicable to, for example, an X-ray image read-out apparatus wherein conventional X-ray film is used as described above with reference to FIGS. 5 and 6.

The second method for judging an irradiation field in accordance with the present invention is applicable to various types of radiation image read-out apparatuses wherein a radiation image of an object is read out from a recording medium, in order to obtain an image signal comprising a plurality of image signal components corresponding to picture elements located on the recording medium.

What is claimed is:

1. A method for judging an irradiation field, the steps comprising:
   i) obtaining an image signal, which comprises a plurality of image signal components corresponding to picture elements located on a recording medium from an image readout from the recording medium on which a radiation image of an object has been recorded,
   ii) determining the shape and location of a region, which is considered to be an irradiation field formed on the recording medium on the basis of said image signal components,
   iii) calculating the ratio of the number of picture elements located in said region to the total number of the picture elements located on said recording medium,
   iv) comparing said ratio with a predetermined value, and
   v) judging that said region is not the whole area of the irradiation field in cases where said ratio is not larger than the predetermined value.

2. A method as defined in claim 1 wherein the radiation is X-rays.

3. A method as defined in claim 1 wherein said recording medium is a stimulable phosphor sheet.

4. A method as defined in claim 3 wherein said image signal is obtained from a read-out operation wherein said stimulable phosphor sheet is exposed to stimulating rays which cause it to emit light in proportion to the amount of energy stored during exposure to radiation, and the emitted light is photoelectrically detected.

5. A method as defined in claim 1 wherein said recording medium is photographic film.

6. A method for judging an irradiation field, which comprises the steps of:
   i) obtaining an image signal, which comprises a plurality of image signal components corresponding to picture elements located on a recording medium from an image readout from the recording medium on which a radiation image of an object has been recorded,
   ii) determining the shape and location of a region, which is considered to be an irradiation field formed on the recording medium on the basis of said image signal components,
   iii) calculating a characteristic value of image signal components corresponding to picture elements located in said region,
   iv) comparing said characteristic value with a predetermined value, and
   v) judging whether said region is the whole area of the irradiation field or is part thereof on the basis of the results of the comparison.

7. A method as defined in claim 6 wherein said part of said irradiation field is a background region upon which the radiation impinged directly without passing through said object or without being reflected from said object during the recording of said radiation image.

8. A method as defined in claim 6 or 7 wherein said characteristic value is a value representing the mean-level amount of the radiation which impinged upon said region during the recording of said radiation image.

9. A method as defined in claim 6 or 7 wherein said characteristic value is a value representing the degree of dispersion of the amount of the radiation which impinged upon respective positions in said region during the recording of said radiation image.

10. A method as defined in claim 6 wherein the radiation is X-rays.

11. A method as defined in claim 6 wherein said recording medium is a stimulable phosphor sheet.

12. A method as defined in claim 11 wherein said image signal is obtained from a read-out operation wherein said stimulable phosphor sheet is exposed to stimulating rays which cause it to emit light in proportion to the amount of energy stored during exposure to radiation, and the emitted light is detected photoelectrically.

13. A method as defined in claim 6 wherein said recording medium is photographic film.

* * * * *